United States Patent [19]
Schmidt et al.

[11] Patent Number: 5,781,667
[45] Date of Patent: Jul. 14, 1998

[54] APPARATUS FOR HIGH SPEED MORPHOLOGICAL PROCESSING

[75] Inventors: Robert C. Schmidt, Redmond; Shih-Jong J. Lee, Bellevue; James A. Stephanick, Seattle, all of Wash.

[73] Assignee: NeoPath, Inc., Redmond, Wash.

[21] Appl. No.: 509,154

[22] Filed: Jul. 31, 1995

[51] Int. Cl.⁶ .............................. G06K 9/56; G06K 9/60
[52] U.S. Cl. .................... 382/308; 382/180; 382/205; 382/270; 382/303
[58] Field of Search ........................ 382/308, 257, 382/270, 180, 205, 303, 304

[56] References Cited

U.S. PATENT DOCUMENTS

| | | | |
|---|---|---|---|
| 4,692,943 | 9/1987 | Pietzsch et al. | 382/148 |
| 4,791,675 | 12/1988 | Deering et al. | 382/308 |
| 5,148,500 | 9/1992 | Belanger | 382/308 |
| 5,463,698 | 10/1995 | Meyer | 382/276 |
| 5,537,485 | 7/1996 | Nishikawa et al. | 382/130 |

*Primary Examiner*—Phuoc Tran
*Attorney, Agent, or Firm*—Hans I. Sun; Emil Moffa

[57] ABSTRACT

A method for high speed morphological processing in a computerized image processing system starts by acquiring a binary image and selecting feature and height values corresponding to a desired morphological processing of an image. The image is scanned in a raster scanning sequence so as to produce a scanned image including a plurality of pixels. A sequential labeling transformation is performed on each of the plurality of pixels of the scanned image so as to produce a transformed image. A thresholding operation is performed on the transformed image. The resultant image is translated.

7 Claims, 12 Drawing Sheets

X: THE PIXELS IN M(i,j)

BINARY MORPHOLOGICAL
KERNEL

| P2 | P3 | P4 | P5 | P6 |
|----|----|----|----|----|
|    | P1 | X  |    |    |

60

| 1 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |

62

ORIGINAL IMAGE 70

| 0 | 0 | 0 | 0 | 0 | 0 | 0 | 0 | 0 | 0 | 0 | 0 |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 1 | 1 | 0 | 0 | 0 | 0 | 0 | 0 |
| 0 | 0 | 0 | 0 | 1 | 0 | 0 | 0 | 0 | 0 | 0 | 0 |
| 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

DILATION 5X5

| 0 | 0 | 0 | 0 | 0 | 0 | 0 | 0 | 0 | 0 | 0 | 0 |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 5 | 5 | 4 | 3 | 2 | 1 | 0 | 0 |
| 0 | 0 | 0 | 0 | 5 | 4 | 4 | 3 | 2 | 1 | 0 | 0 |
| 0 | 0 | 0 | 0 | 5 | 4 | 3 | 3 | 2 | 1 | 0 | 0 |
| 0 | 0 | 0 | 0 | 4 | 3 | 3 | 2 | 2 | 1 | 0 | 0 |
| 0 | 0 | 0 | 0 | 3 | 3 | 2 | 2 | 1 | 1 | 0 | 0 |
| 0 | 0 | 0 | 0 | 2 | 2 | 2 | 1 | 1 | 0 | 0 | 0 |
| 0 | 0 | 0 | 0 | 1 | 1 | 1 | 1 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

Fig-8

THRESHOLD/SHIFT

| 0 | 0 | 0 | 0 | 0 | 0 | 0 | 0 | 0 | 0 | 0 | 0 |   |   |
|---|---|---|---|---|---|---|---|---|---|---|---|---|---|
| 0 | 0 | 0 | 0 | 0 | 0 | 0 | 0 | 0 | 0 | 0 | 0 |   |   |
| 0 | 0 | 0 | 0 | 0 | 0 | 0 | 0 | 0 | 0 | 0 | 0 | 0 | 0 |
| 0 | 0 | 0 | 0 | 1 | 1 | 1 | 1 | 1 | 1 | 0 | 0 | 0 | 0 |
| 0 | 0 | 0 | 0 | 1 | 1 | 1 | 1 | 1 | 1 | 0 | 0 | 0 | 0 |
| 0 | 0 | 0 | 0 | 1 | 1 | 1 | 1 | 1 | 1 | 0 | 0 | 0 | 0 |
| 0 | 0 | 0 | 0 | 1 | 1 | 1 | 1 | 1 | 1 | 0 | 0 | 0 | 0 |
| 0 | 0 | 0 | 0 | 1 | 1 | 1 | 1 | 1 | 1 | 0 | 0 | 0 | 0 |
| 0 | 0 | 0 | 0 | 1 | 1 | 1 | 1 | 1 | 0 | 0 | 0 | 0 | 0 |
| 0 | 0 | 0 | 0 | 1 | 1 | 1 | 1 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
|   | 0 | 0 | 0 | 0 | 0 | 0 | 0 | 0 | 0 | 0 | 0 | 0 | 0 |
|   | 0 | 0 | 0 | 0 | 0 | 0 | 0 | 0 | 0 | 0 | 0 | 0 | 0 |

Fig-9

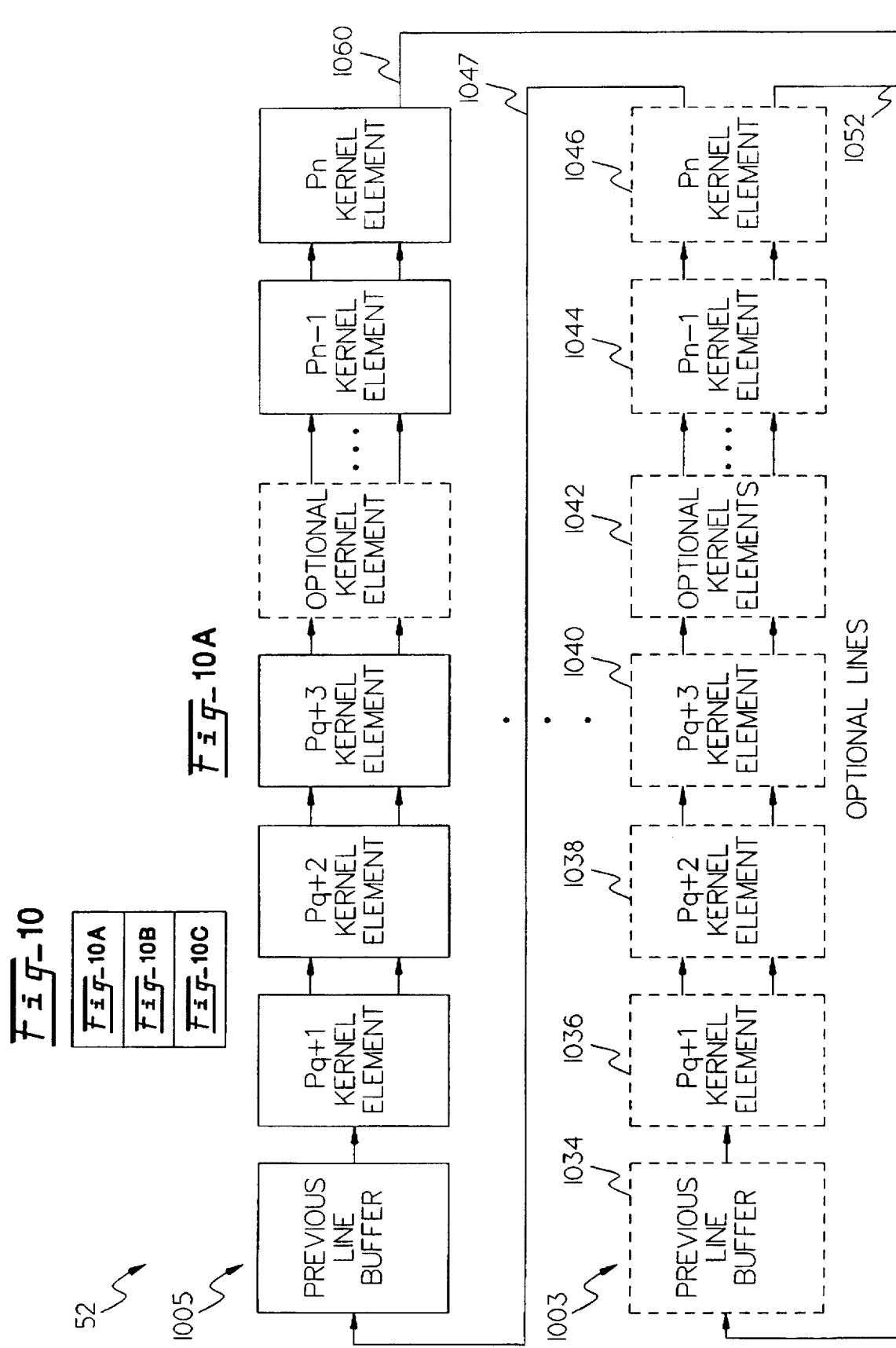

APPARATUS FOR HIGH SPEED MORPHOLOGICAL PROCESSING

BACKGROUND OF THE INVENTION

This invention relates to a method and apparatus for high speed morphological processing in a computerized image processing system. More particularly, the present invention relates to high speed morphological processing of images in an automated biological screening system, such as a system for analyzing cytological specimens stained according to the Papanicolaou stain process.

Morphology, a powerful methodology in image analysis, employs morphological operators such as dilation and erosion. Hardware acceleration facilitates the adaptation of morphology technology to practical applications. However, prior art architectures, designed primarily for small kernel size structuring elements, cannot efficiently execute large kernel operations without extremely complicated architectures and expensive hardware requirements. Generally, there are three basic methods of implementing binary morphology, namely, the general-purpose microprocessor, the special purpose pipeline processor, and the special purpose parallel processor.

A general purpose microprocessor, being flexible, can perform most any size or shape operation. However, the general purpose microprocessor requires multiple processor instructions per pixel to perform each morphological operation making it very slow.

The pipelined or multiple instruction single data (MISD) approach uses a dedicated hardware implementation needing a very long pipeline, including previous line storage for a single pass. MISD machines tend to be very complex and expensive but fast. However, MISD machines require multiple operation passes or multiple long line delays to implement large structuring elements. This approach is very expensive.

The parallel or single instruction multiple data (SIMD) approach sometimes called parallel processing, assigns one processing element to each pixel. Large structuring elements require multiple passes and large image sizes require multiple hardware modules. In addition, operational speed is slowed down by sequential processing of multiple subimages.

SUMMARY OF THE INVENTION

A method for high speed morphological processing in a computerized image processing system starts by acquiring a binary image and selecting feature and height values corresponding to a desired morphological processing of the image. The image is scanned in a raster scanning sequence so as to produce a scanned image including a plurality of pixels. A sequential labeling transformation is performed on each of the plurality of pixels of the scanned image so as to produce a transformed image. A thresholding operation is performed on the transformed image. The resultant image is translated.

This invention includes a sequential labeling transformation procedure and a hardware architecture and implementation of the procedure for binary morphology. The hardware implements the procedure directly to gain the maximum throughput and efficiency, thereby significantly decreasing the time of morphology operations.

This invention uses a simple kernel approach to provide variable sized and flexibly shaped structuring elements in a single pass operation. It is a kernel size independent approach. It can process large kernel operations as fast as small kernel operations. The implementation can be made in a gate array. The speed of the implementation is determined by the speed of the gate array process chosen. The pixel width, number of columns, of the image should be less than or equal to the size of the line buffer implemented.

The data processing procedure and hardware implementation of this invention offer a high speed solution to binary morphology. The invention provides a hardware pipeline architecture capable of processing a pixel for each processor cycle, and can complete a binary dilation or erosion in one pass through an image. The invention can implement a large structuring element in the same amount of time as a small one by processing one pixel per cycle, one pass over the image.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIG. 8 shows an example of a dilation operation.

FIG. 9 shows an example of a threshold/shift of dilated results post transformation.

DETAILED DESCRIPTION OF THE PREFERRED EMBODIMENT

Figure 1:
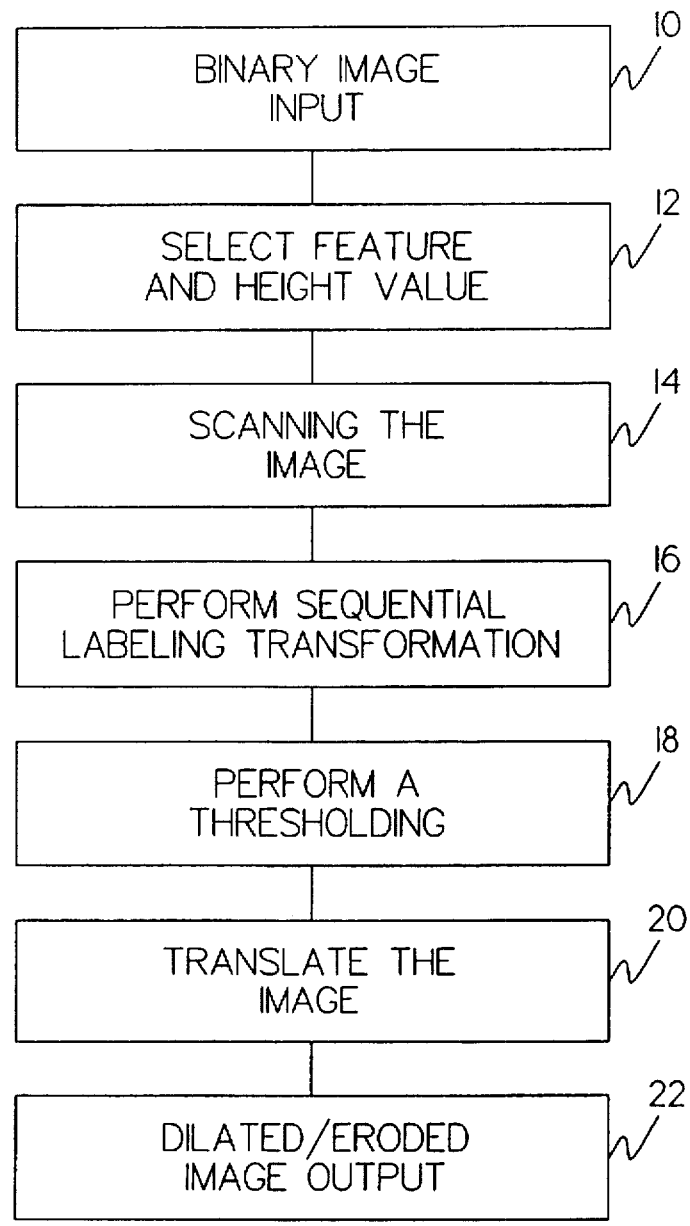
FIG. 1 shows the method of the invention to morphologically process a binary image.

Refer now to FIG. 1 which shows an example of fast binary morphological operations of the invention. The fast binary morphological operations operate on binary image 10 and comprise the following steps:

(a) selecting feature values and height values of the operation in step 12;

(b) scanning the image in a raster scanning sequence in step 14;

(c) performing a sequential labeling transformation on each pixel of the scanned image in step 16;

3

(d) performing a thresholding operation in step 18; and (e) translating the image in step 20.

Step 12, selecting feature values and height values of the operation, processes a binary image 10 having R rows and C columns comprising pixels with two values called 'foreground' and 'background'. Each pixel of the image 10 is indexed by its corresponding row number and column number, i.e., B(i,j) represents the image pixel at the $i^{th}$ row and $j^{th}$ column of the binary image. A feature value is selected for the operation. 'Foreground' is selected as the feature value if a dilation of the foreground is desired and 'background' is selected as the feature value if an erosion of the foreground is the desired outcome. The height value is selected based on the size of the desired structuring element. The larger the desired structuring element, the higher the selected height value.

Scanning the image in a raster scanning sequence step 14 comprises a sequential processing procedure that is applied to the binary image 10. Step 14 is applied to each pixel of the image in a forward scanning pass. The forward pass processes the local neighborhood of each pixel in a raster scan sequence 28 from left to right, indicated by arrow 24, and top to bottom as indicated by arrow 26 shown in FIG. 2.

Figure 3:
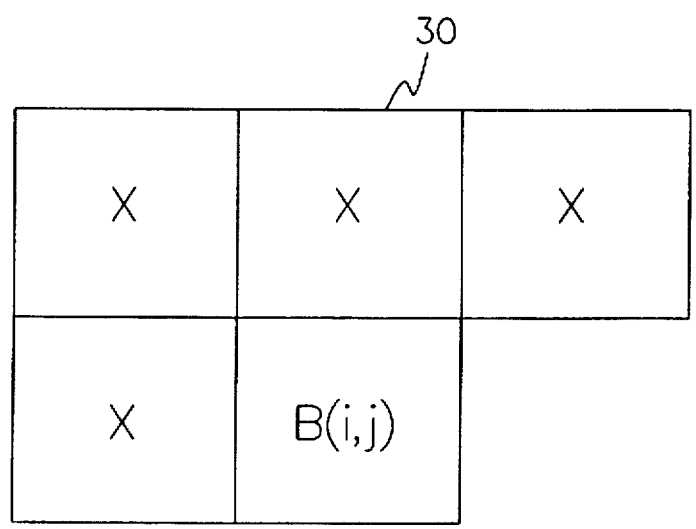
FIG. 3 shows an example of a neighborhood kernel proximate an image pixel.

Step 16 applies a sequential labeling transformation procedure to each pixel of the image 10 as the image 10 is being scanned in the raster scanning sequence 28. The transformation operation can be described for each pixel as follows:

$dt(i,j)$=height; if $B(i,j)$=feature $dt(i,j)$=max{0, $|dt(h,k)-m(h,k)$ for all $(h,k)$ in $M(i,j)|$} elsewhere;

where B(i,j) represents the image pixel at the $i^{th}$ row and $j^{th}$ column of the binary image (10); and M(i,j) is the neighborhood kernel of a set of pixels around B(i,j). An example of M(i,j) is shown as structure 30 comprising pixels designated "X" in FIG. 3. Parameter m(h,k) is the pre-determined weight of the pixel (h,k) in M(i,j). Dt(i,j) is the pixel at the $i^{th}$ row and $j^{th}$ column of the resulting sequentially labelled image.

Figure 4:
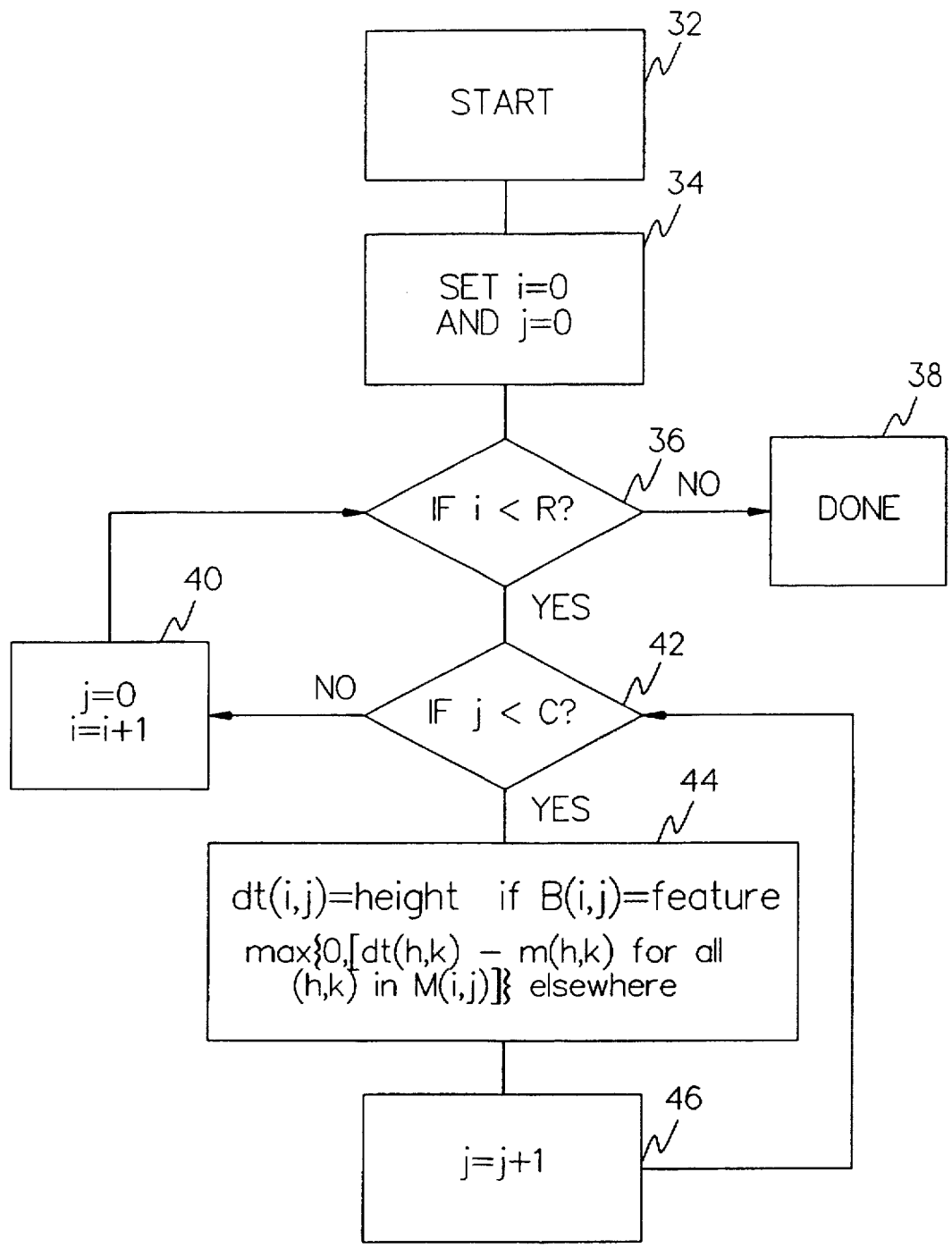
FIG. 4 shows a flow diagram of the raster scanning and sequential labeling transformation method and apparatus as employed in one embodiment of the invention.

Referring now to FIG. 4, a flow diagram of the raster scanning and sequential labeling transformation is shown. The process starts 32 by setting i=0 and j=0 in step 34. In step 36, the process determines if i is less than R, where R represents the number of rows; if i is less than R, the process flows to step 42. If i is not less than R the process flows to step 38 and is done. In step 42 the process determines if j is less than C, where C represents the number of columns. If j is less than C, the process flows to step 44. If j is not less than C then the process flows to step 40 to set j=0 and increment i, and return to step 36. In step 44 (dt (i,j) is set to height if B(i,j) is equal to the feature value. For a binary system, the feature value may be 1 or 0 and B(i,j) may be 1 or 0. Otherwise dt(i,j)=max {0, |dt(h,k)-m(h,k) for all (h,k) in M(i,j)|}.

Performing a thresholding operation assigns the feature value to all pixels having non-zero dt values. The process can be described as: T(i,j)=feature if dt(i,j)>0; nonfeature elsewhere. Where T(i,j) is the tresholded image, nonfeature is "foreground" if the feature value is "background" and vice versa.

Translating the image step 20 translates thresholded image T according to an amount determined by the size of the resulting structuring element.

Binary morphological operations are all performed as dilations using a sequential labelling transform method of

4 the invention. The invention accomplishes a closing by dilating the foreground in the first pass and then dilating the background in the second pass. The foreground eroding process is analogous to dilating the background. The passes can be sequential allowing a first machine to do a foreground dilation and a second machine to do a background dilation in the same pass. The same machine could also do both passes if set up twice.

Figure 2:
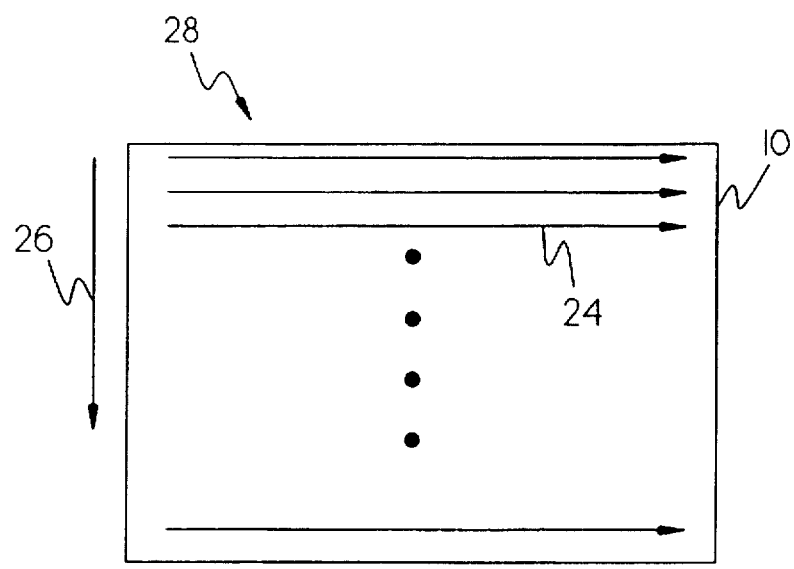
FIG. 2 shows a scanning sequence used by the method of the invention.

The pixels are processed in a rasterized format from left to right, top to bottom as illustrated by FIG. 2. Where B(X) is the current pixel element, and dt(X) is the intermediate result.

In one example embodiment, the invention dilates the binary image to the right and down, in the direction of the data flow. To compensate for the position offset of the image, the origin of the image must be shifted by one half the size of the kernel by a translation operation. This shift will have the effect of re-centering the dilated image.

In one embodiment data is passed from one image buffer through a pixel processor to another image buffer. The data captured in the destination image buffer must provide a complete data shift, in order to re-center the image around the center of the object of interest.

In one embodiment of the invention, a 6 pixel kernel is used, with an adder to perform all math functions. Therefore when programming the part for subtraction, as in the binary dilation, the register value used is a "ones" complement negative number and the carry-in bit is set to provide a "twos" complement equivalent.

Figure 5:
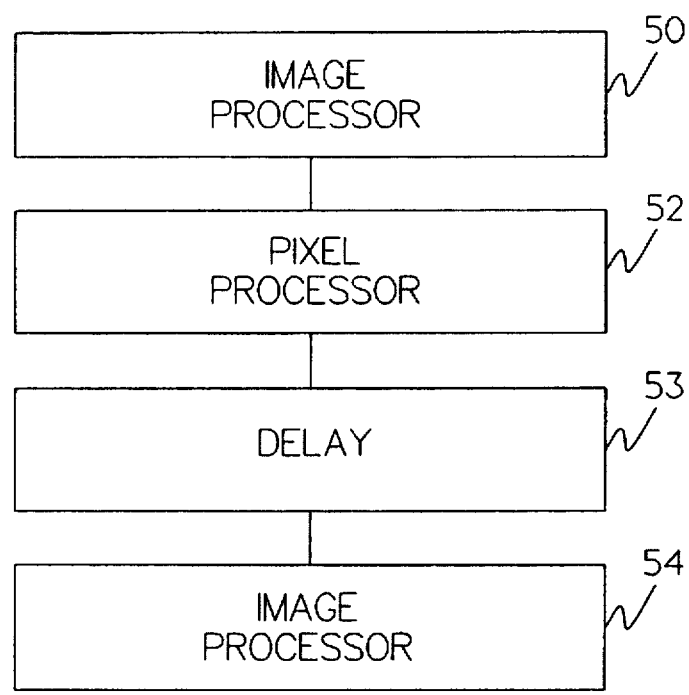
FIG. 5 shows a high level hardware flow diagram of the method of the invention.

Referring now to FIG. 5, a high level hardware flow diagram of the method of the invention is there shown. The hardware flow comprises a first image processor 50, a pixel processor 52, a transition delay element 53, and a second image processor 54. The first image processor 50 sources an image left to right and top to bottom. The pixel processor 52 processes the image employing a sequential labeling transform operation to generate a transformed image. The transition delay element receives the transformed image from the pixel processor 52 where the image is received as scanned from left to right and top to bottom. The transition delay element 53 provides a row and column shift of the image of ½ the length in pixels and ½ the width in pixels of the structuring element to the second image processor 54.

Referring now to FIGS. 6–9, an example of the method of the invention is illustrated.

Example

Figures 6, 7:
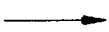
FIG. 6 schematically shows a morphological operation as employed in one embodiment of the invention.
FIG. 7 shows an example of an original image.

FIG. 6 illustrates schematically the kernel shape of one embodiment of the invention using a binary morphological kernel 60 to produce a 5×5 dilation element 62. The following parameters may serve as an example demonstrating the method of the invention. In this example the feature is set to "1" and height is set to "5". If B(X)=1 then set dt(X)= height If B(X)=0 then set dt(X)=Max |0, (dt(P1)−m(P1)), (dt(P2)−m(P2)), (dt(P3)−m(P3)), (dt(P4)−m(P4)), (dt(P5) −m(P5))| Output=1 if dt(X)>0.

| Where m(P1) = 1, | Element Enabled |
| m(P2) = Don't Care, | Element Disabled |
| m(P3) = 1, | Element Enabled |
| m(P4) = 1, | Element Enabled |
| m(P5) = Don't Care, | Element Disabled |
| m(P6) = Don't Care, | Element Disabled |

Refer now to FIG. 7 there shown is an example of an original image, the first image processor sources the original image left to right, top to bottom. The region of interest for this example is a 10×10 pixel region 70. A boundary of zeros is used to set the boundary conditions.

Referring now to FIG. 8, an example of a dilation operation is shown wherein a sequential labeling transform has been performed, dilating the binary objects. The dilated results are thresholded and sent to the transition delay element where they are saved.

Referring now to FIG. 9, the transition delay element delays the thresholded results by a value equivalent to one half the structuring element in length times an image width in pixels plus one half the structuring element width in pixels. For this example the delay is 5/2, rounded to 2, times the line width (12) plus 5/2, rounded to 2 pixels for a total of 26 pixels. Generally:

$$\text{delay} = \frac{SL}{2} * IW + \frac{SW}{2}$$

where SL=Structuring element length in pixels,
SW=Structuring element width in pixels, and
IW=Image width in pixels.

Figure 10B:
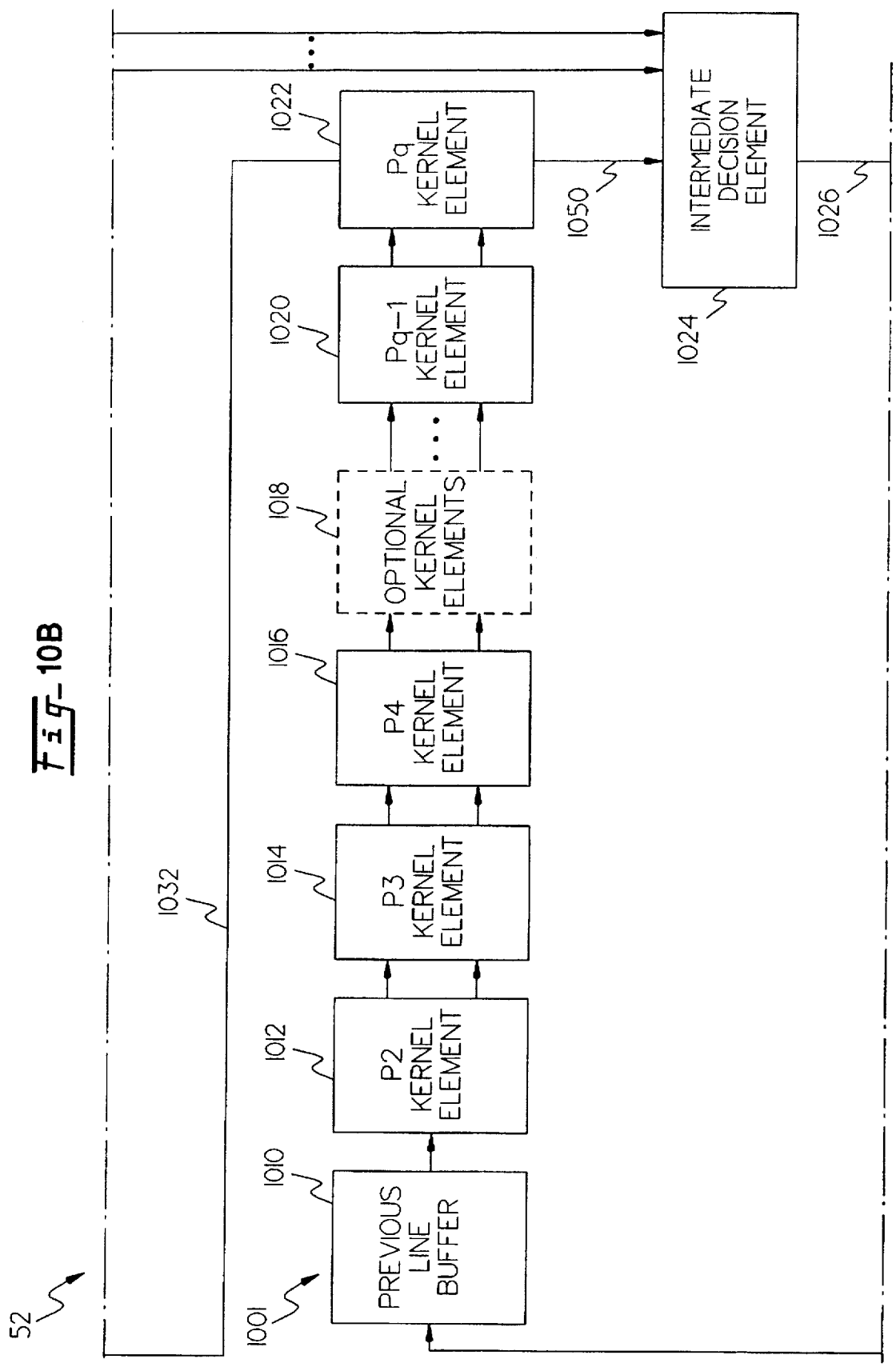
FIG. 10 shows a schematic of a hardware embodiment of the present invention.
Figure 10C:
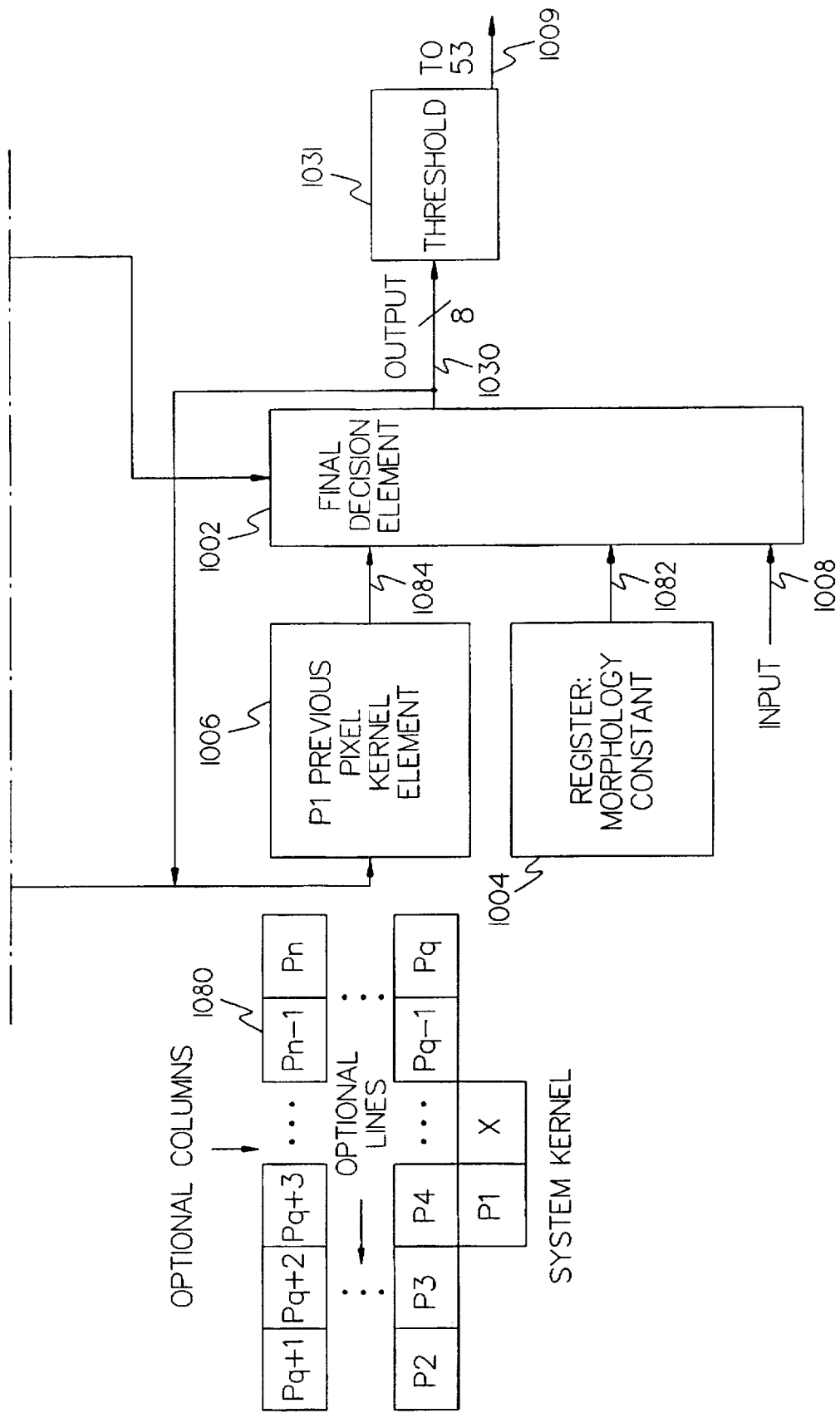

Referring now to FIG. 10 a more detailed schematic of a hardware embodiment of the present invention is shown. The high speed morphological pixel processor 52 comprises a final decision element 1002, a morphology constant register 1004, a P1 previous pixel kernel element 1006, an intermediate decision element 1024 and a set of lines 1001, 1003 and 1005. Line 1001, for example, comprises a previous line buffer 1010, P2 kernel element 1012, P3 kernel element 1014, P4 kernel element 1016, optional kernel elements 1018, $P_{q-1}$ kernel element 1020 and $P_q$ kernel element 1022. Line 1001 has a first output 1032 and a second output 1050. Optional line 1003 receives the first output 1032 from line 1001. Line 1003 is constructed similarly to line 1001 and comprises a previous line buffer 1034, $P_{q+1}$ kernel element 1036, $P_{q+2}$ kernel element 1038, $P_{q+3}$ kernel element 1040, optional kernel elements 1042, $P_{n-1}$ kernel element 1044 and $P_n$ kernel element 1046. Line 1003 has a first output 1047 and a second output 1052. The output 1047 may be connected to the input of the other optional lines or line 1005 which receives the first output from line 1003 or the last optional line. Line 1005 is constructed similarly to line 1001 and line 1003. Line 1005 includes an output 1060. Those skilled in the art having the benefit of this disclosure will appreciate that any suitable number of columns of elements and lines may be used to implement the method of the invention. Such expansion is indicated generally by system kernel diagram 1080.

Intermediate decision element 1024 receives a plurality of line outputs including line outputs 1050, 1052 and 1060 and provides a responsive output 1026 as an intermediate decision input to the final decision element 1002.

Figure 11:
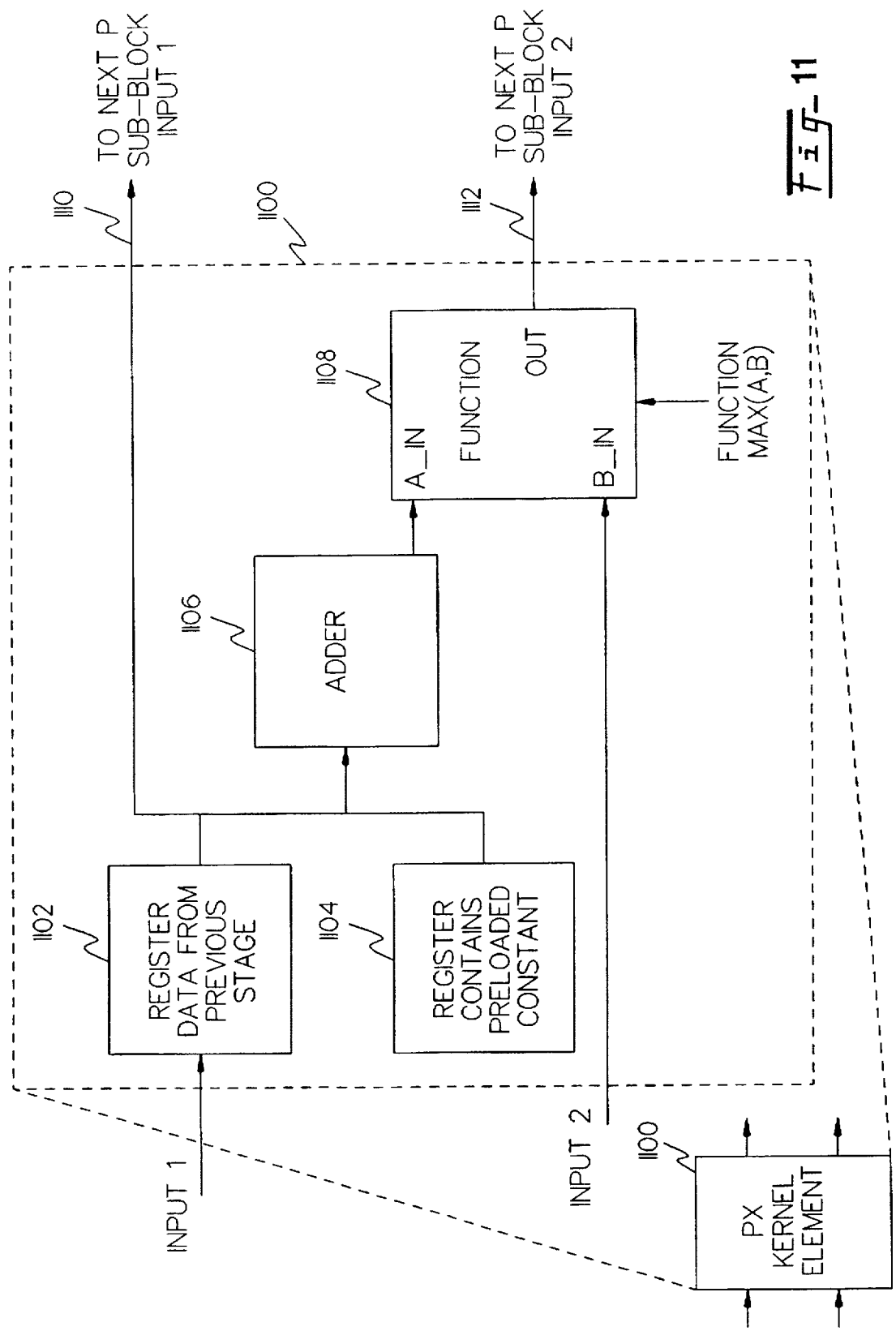
FIG. 11 shows a more detailed schematic of a kernel element block.

Referring now to FIG. 11 a more detailed schematic of a kernel element block 1100 is shown. Element block 1100 is representative of any of the element blocks 1012, 1014, 1016 etc. in lines 1001-1005 which are similarly constructed. Element block 1100 comprises a first register 1102 for receiving register data from the previous stage, a second register 1104 containing a constant and an adder 1106 coupled to add/subtract the contents of the first register and the second register. The output 1110 of the first register 1102 is coupled to the next kernel element block in sequence. The register data from the previous stage is processed with the constant in the third register which provides a responsive output to functional block 1108 at a first input A_IN. The functional block 1108 includes a second input B_IN for receiving a second output from a previous stage functional block. The functional block 1108 in turn provides a functional block output 1112 to the next kernel element block. Functional block 1108 operates to pass the maximum of inputs A_IN and B_IN to the next kernel element block.

Figure 12:
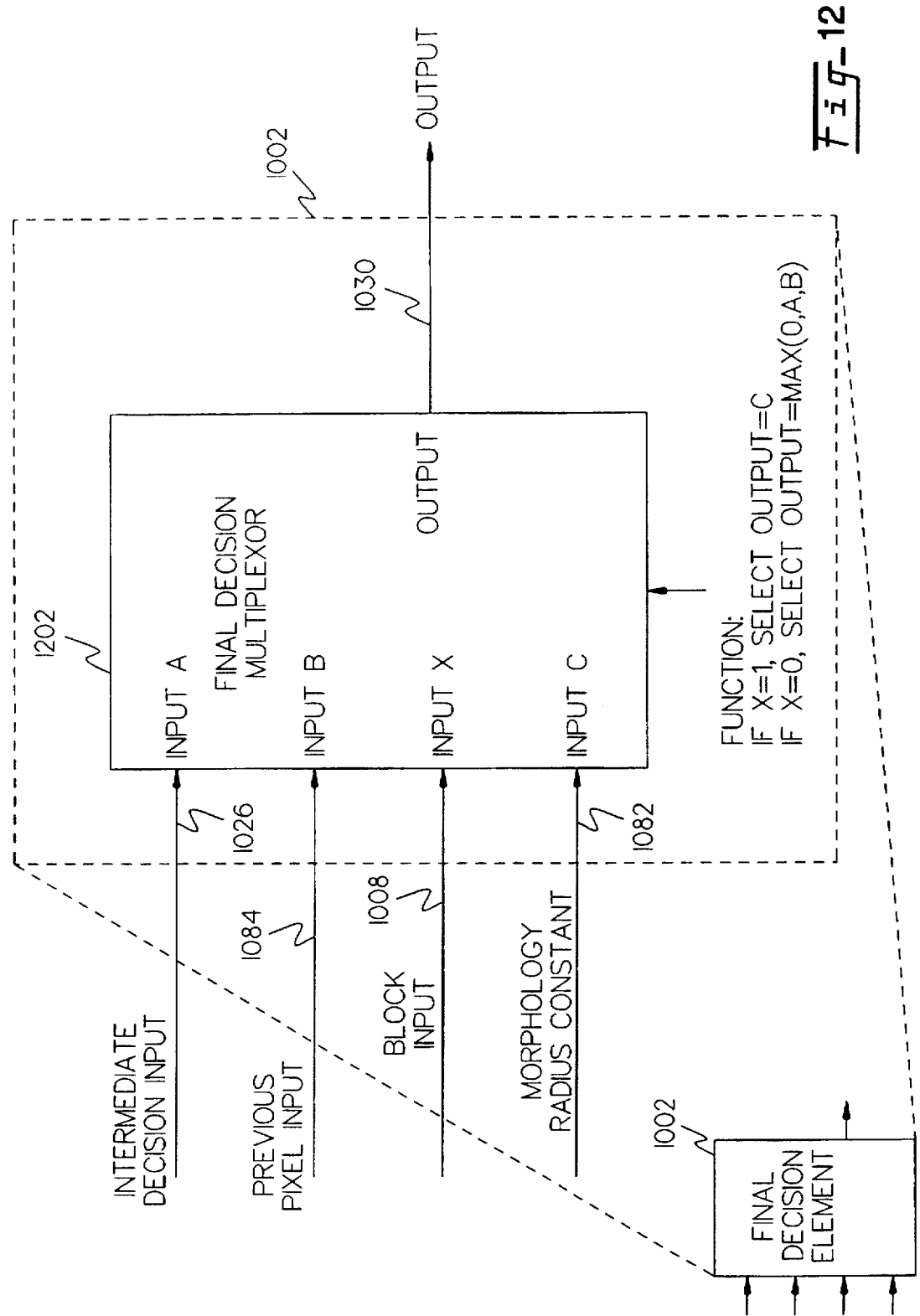
FIG. 12 shows a more detailed schematic of a final decision element block.

Referring now to FIG. 12, a more detailed schematic of a final decision element block is shown. Final decision element 1002 comprises a final decision multiplexer 1202 having an intermediate decision input 1026 at INPUT A, a previous pixel input 1084 at INPUT B, a block input 1008 at INPUT X and a morphology radius constant input 1082 at INPUT C. The final decision multiplexer operates to select a signal for output on line 1030 to threshold function 1031 according to the following relationship. The output on line 1030 may comprise 8 bits, for example.

If X=1, SELECT OUTPUT=C.
If X=0, SELECT OUTPUT=MAX(0,A,B).

Threshold function 1031 provides its output 1009 to the transition delay element 53.

Figure 13:
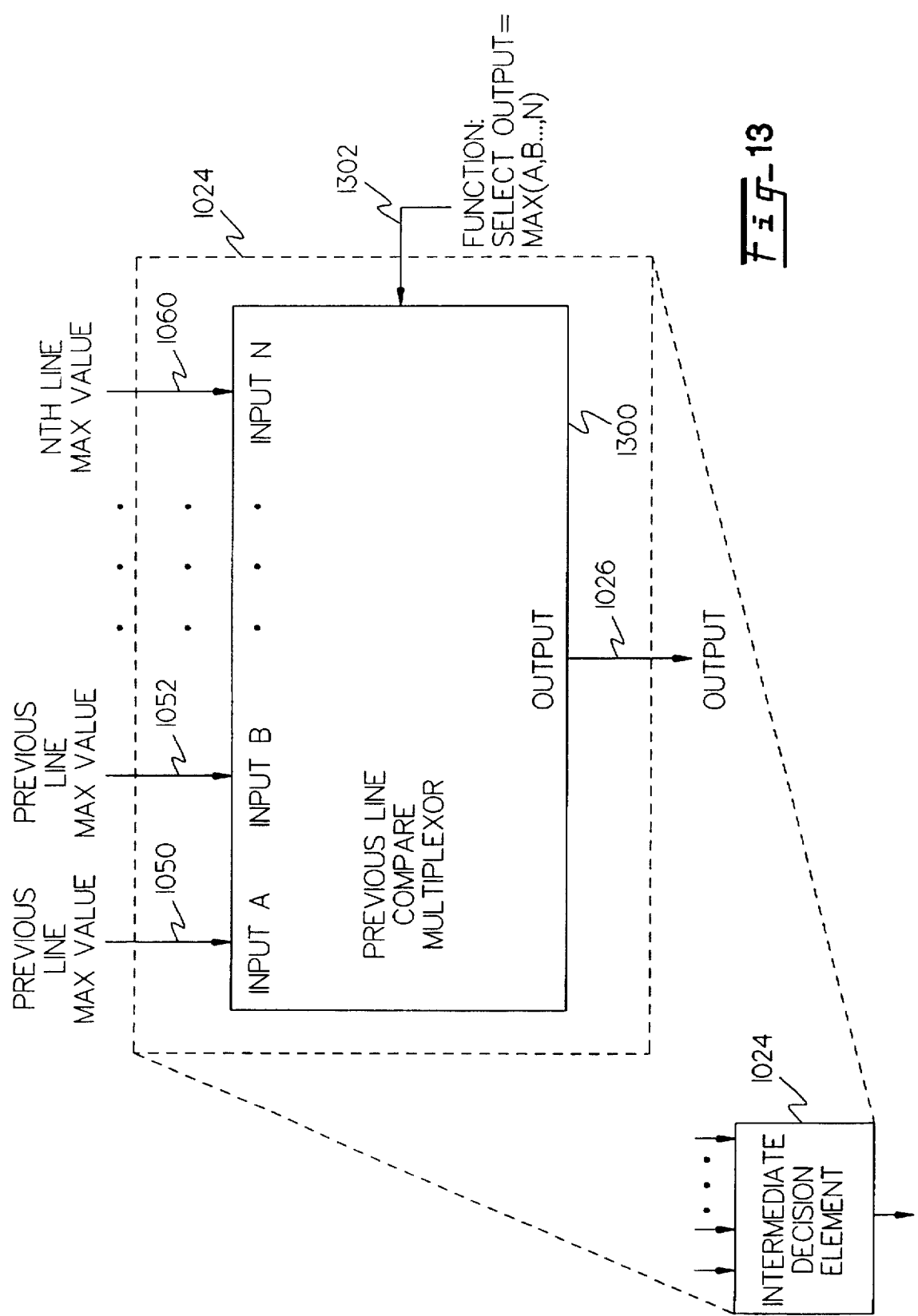
FIG. 13 shows a more detailed schematic of an intermediate decision element block.

Referring now to FIG. 13, a more detailed schematic of an intermediate decision element 1024 is shown. The intermediate decision element 1024 comprises a previous line compare multiplexer 1300 having a plurality of previous line maximum value inputs represented by lines 1050, 1052, 1060 at INPUT A, INPUT B, and INPUT N. A plurality of similarly constructed inputs may be included as indicated by the sequence of dots. The previous line compare multiplexer operates to select a signal for output at output 1026 according to the following relationship.

SELECT OUTPUT=MAX(A,B . . . N).

Thus the maximum previous line value is selected for transmission to the final decision element 1002.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for high speed morphological processing in a computerized image processing system, the method comprising:

(a) acquiring a binary image;

(b) selecting feature and height values for a desired morphological processing of the binary image;

(c) scanning the binary image in a raster scanning sequence so as to produce a scanned image including a plurality of pixels;

(d) performing a sequential labeling transformation on each of the plurality of pixels of the scanned image so as to produce a transformed image by transforming each pixel of the plurality of pixels according to the following relationships: dt(i,j)=height; if B(i,j)=feature dt(i,j)=max{0, {dt(h,k)−m(h,k) for all (h,k) in M(i,j)} } elsewhere, where B(i,j) represents an image pixel at an $i^{th}$ row and $j^{th}$ column of the binary image, M(i,j) is a neighborhood kernel of a set of pixels around B(i,j), m(h,k) is a predetermined weight of a pixel (h,k) in M(i,j) and dt(i,j) is a pixel at the $i^{th}$ row and $j^{th}$ column of a resulting sequentially labelled image;

(e) performing a thresholding operation on the transformed image so as to generate a thresholded image; and (f) translating the thresholded image.

2. The method of claim 1 wherein the height values correspond to a size of a morphological structuring element.

3. An apparatus for high speed morphological processing in a computerized image processing system, the apparatus comprising:

(a) means for acquiring a binary image;

(b) means for selecting feature and height values for a desired morphological processing of the binary image;

(c) means for scanning the binary image in a raster scanning sequence so as to produce a scanned image including a plurality of pixels;

(d) means for performing a sequential labeling transformation on each of the plurality of pixels of the scanned image so as to produce a transformed image comprising means for transforming each pixel in the plurality of pixels according to the following relationships: dt(i,j)=height; if B(i,j)=feature dt(i,j)=max {0 {dt(h,k)−m(h,k) for all (h,k) in M(i,j)} } elsewhere, where B(i,j) represents an image pixel at an $i^{th}$ row and $j^{th}$ column of the binary image, M(i,j) is a neighborhood kernel of a set of pixels around B(i,j), m(h,k) is a predetermined weight of a pixel (h,k) in M(i,j) and dt(i,j) is a pixel at the $i^{th}$ row and $j^{th}$ column of a resulting sequentially labelled image;

(e) means for performing a thresholding operation connected to receive the transformed image and having a thresholded image output; and (f) means for translating the thresholded image output.

4. The apparatus of claim 3 wherein the height values correspond to a size of a morphological structuring element.

5. An apparatus for high speed morphological processing in a computerized image processing system, the apparatus comprising:

(a) means for acquiring a binary image;

(b) means for selecting feature and height values for a desired morphological processing of the binary image;

(c) means for scanning the binary image in a raster scanning sequence so as to produce a scanned image including a plurality of pixels;

(d) means for performing a sequential labeling transformation on each of the plurality of pixels of the scanned image so as to produce a transformed image having:

(i)|(a)| a final decision element having a first input, a second input, a third input and a fourth input;

(ii)|(b)| a previous pixel kernel element register connected to the first input;

(iii)|(c)| a morphology constant register connected to the second input;

(iv)|(d)| an intermediate decision element connected to the third input;

(v)|(e)| a set of previous line buffers connected in sequence so as to provide data to the intermediate decision element; and (vi)|(f)| a binary input image connected to the fourth input;

(e) means for performing a thresholding operation connected to receive the transformed image and having a thresholded image output; and (f) means for translating the thresholded image output.

6. The apparatus of claim 5 wherein the set of previous line buffers each comprise:

(a) a previous line buffer; and (b) a plurality of kernel elements wherein a first kernel element is connected to the previous line buffer, and the plurality of elements are sequentially connected so as to provide an output to the intermediate decision element.

7. The apparatus of claim 5 wherein the height values correspond to a size of a morphological structuring element.

* * * * *

UNITED STATES PATENT AND TRADEMARK OFFICE
CERTIFICATE OF CORRECTION

PATENT NO. : 5,781,667
DATED : July 14, 1998
INVENTOR(S) : Schmidt et al.

It is certified that error appears in the above-identified patent and that said Letters Patent is hereby corrected as shown below:

Column 3, line 52, delete the word "return" and replace it with -- returns --.

Column 3, line 60, delete the word "tresholded" and replace it with

-- thresholded --.

In the Claims

Column 8, line 9, delete "[(a)]".

Column 8, line 11, delete "[(b)]".

Column 8, line 13, delete "[(c)]".

Column 8, line 15, delete "[(d)]".

Column 8, line 17, delete "[(e)]".

Column 8, line 20, delete "[(f)]".

Signed and Sealed this

Twenty-sixth Day of January, 1999

Attest:

*Attesting Officer*

*Acting Commissioner of Patents and Trademarks*